(12) United States Patent
Lai et al.

(10) Patent No.: US 9,605,124 B2
(45) Date of Patent: Mar. 28, 2017

(54) METHOD FOR MAKING IMPACT-ABSORPTIVE MATERIAL

(71) Applicant: NATIONAL CHUNG SHAN INSTITUTE OF SCIENCE AND TECHNOLOGY

(72) Inventors: Teh-Long Lai, New Taipei (TW); Chun-Ho Chen, New Taipei (TW); Chin-Wei Chun, New Taipei (TW); Chin-Tsai Li, New Taipei (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 307 days.

(21) Appl. No.: 14/333,636

(22) Filed: Jul. 17, 2014

(65) Prior Publication Data

US 2016/0016341 A1 Jan. 21, 2016

(51) Int. Cl.
*C08J 9/00* (2006.01)
*B29C 44/34* (2006.01)
*B29K 83/00* (2006.01)
*B29K 509/00* (2006.01)

(52) U.S. Cl.
CPC ............ *C08J 9/00* (2013.01); *B29C 44/3492* (2013.01); *B29K 2083/00* (2013.01); *B29K 2509/00* (2013.01)

(58) Field of Classification Search
CPC .. C08L 83/04; C08L 2205/22; C08L 2666/58; C08L 83/00; A41D 31/0044; B29C 44/3492
See application file for complete search history.

(56) References Cited

U.S. PATENT DOCUMENTS

| | | | | |
|---|---|---|---|---|
| 5,976,752 A | * | 11/1999 | Matsunaga | G03G 9/087 430/106.2 |
| 6,379,444 B1 | * | 4/2002 | Adkins | C09D 11/36 106/31.6 |
| 8,490,213 B2 | * | 7/2013 | Neal | A41D 31/005 2/2.5 |
| 2004/0171321 A1 | * | 9/2004 | Plant | A41D 31/005 442/64 |
| 2005/0037189 A1 | * | 2/2005 | Palmer | A41D 13/015 428/304.4 |
| 2007/0029690 A1 | * | 2/2007 | Green | A41D 31/0044 264/50 |

(Continued)

*Primary Examiner* — Jodi C Franklin
(74) *Attorney, Agent, or Firm* — Schmeiser, Olsen & Watts, LLP

(57) ABSTRACT

A method for making an impact-absorptive material is introduced. The method involves mixing silicon dioxide ($SiO_2$) particles, polydimethylsiloxane (PDMS), and an appropriate amount of an additive, allowing the mixture to settle until tiny bubbles in the mixture are evenly distributed, thereby forming a colloidal solution raw material, adding a crosslinking agent to the colloidal solution raw material to form a colloidal solution plastic material, filling a die with the colloidal solution plastic material, heating the colloidal solution plastic material in the die such that it takes shape and forms an effective impact absorbing material, quickly and at low costs, for use in physical education, medicine, transportation, and safety-enhancing equipment.

8 Claims, 1 Drawing Sheet

(56) References Cited

U.S. PATENT DOCUMENTS

| | | | | |
|---|---|---|---|---|
| 2009/0111931 A1* | 4/2009 | Pouchelon | ............... | C08L 83/04 |
| | | | | 524/500 |
| 2010/0221521 A1* | 9/2010 | Wagner | ............... | B01F 17/0028 |
| | | | | 428/315.5 |
| 2012/0070676 A1* | 3/2012 | Niimi | ....................... | B32B 27/28 |
| | | | | 428/447 |
| 2012/0139138 A1* | 6/2012 | Samuel | ............ | B29D 11/00153 |
| | | | | 264/1.36 |
| 2012/0142239 A1* | 6/2012 | Budden | ................... | C08L 83/04 |
| | | | | 442/59 |
| 2013/0075961 A1* | 3/2013 | Chen | .................... | B29C 35/0805 |
| | | | | 264/496 |
| 2013/0158148 A1* | 6/2013 | Tsugane | ................ | C08F 299/08 |
| | | | | 522/28 |
| 2013/0309412 A1* | 11/2013 | Toub | ..................... | B32B 27/322 |
| | | | | 427/515 |
| 2015/0126631 A1* | 5/2015 | Bruno | ........................ | C08J 9/42 |
| | | | | 521/54 |
| 2016/0016341 A1* | 1/2016 | Lai | ............................ | C08J 9/00 |
| | | | | 264/41 |

\* cited by examiner

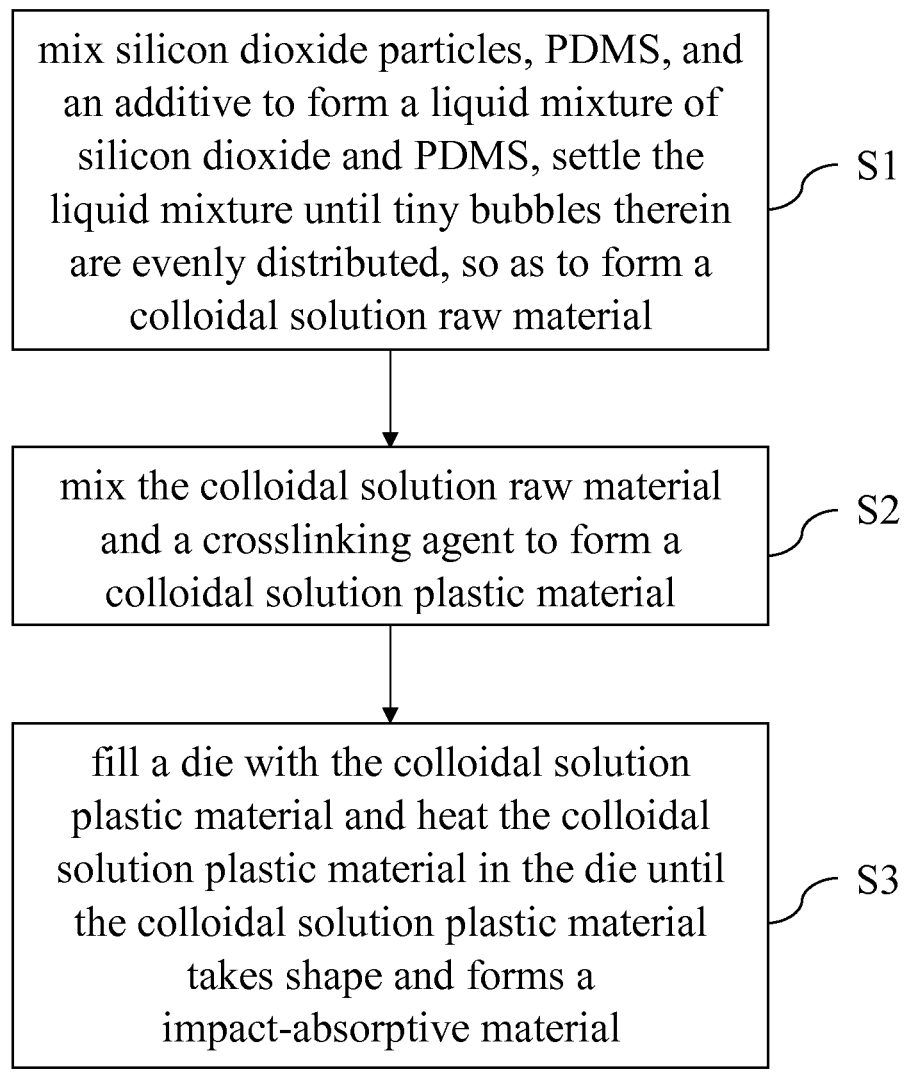

METHOD FOR MAKING IMPACT-ABSORPTIVE MATERIAL

FIELD OF TECHNOLOGY

The present invention relates to methods for making an impact-absorptive material, and more particularly, to a method for making an impact-absorptive material, and the method involves integrating a colloidal solution by performing thereon processes of compounding, ripening, foaming, and curing.

BACKGROUND

In general, a conventional colloidal solution is fluidic and thus must be administered to a carrier when in use. However, in doing so, its content by percentage decreases, and its capability of impact absorption diminishes.

The prior art does not disclose any systemic approach to integrate a colloidal solution and PU (Poly Urethane) or EVA (Ethylene-Vinylene Acetate copolymer) which is currently manufactured by mass production. As a result, the absence of the aforesaid integration technique prevents colloidal solutions from being applied in products currently manufactured by mass production.

Accordingly, it is imperative to provide a method for making an impact-absorptive material from a raw material of a colloidal solution easily and quickly, dispensing with the need to administer the colloidal solution to a carrier, increasing the content of an effective material to at least 30% wt, enhancing impact absorption greatly, being compatible with the mass production of PU and EVA, and being applicable to products currently manufactured by mass production.

SUMMARY

It is an objective of the present invention to provide a method for making an impact-absorptive material by performing processes, such as compounding, ripening, foaming, and curing, on a colloidal solution, to render a colloidal solution impact absorbing and easy to shape with a die.

In order to achieve the above and other objectives, the present invention provides a method for making an impact-absorptive material, comprising: (step 1): blending silicon dioxide particles, polydimethylsiloxane (PDMS), and an appropriate amount of isopropanol so as to form a liquid mixture essentially comprising silicon dioxide and PDMS, allowing the liquid mixture to settle until tiny bubbles in the liquid mixture are evenly distributed, thereby forming a colloidal solution raw material; (step 2): mixing a crosslinking agent and the colloidal solution raw material to perform thereon a foaming process and thus form a colloidal solution plastic material; and (step 3): filling a die with the colloidal solution plastic material and heating the colloidal solution plastic material in the die until it cures, such that the colloidal solution plastic material takes shape and forms an impact-absorptive material.

Preferably, the method of the present invention is characterized in that the silicon dioxide particles are of a diameter of 50~500,000 nm.

Preferably, the method of the present invention is characterized in that the PDMS are of a molecular weight of 20~5000.

Preferably, the method of the present invention is characterized in that the additive is a volatile solvent, such as ethanol or isopropanol.

Preferably, the method of the present invention is characterized in that silicon dioxide particles account for 30~60% wt of the colloidal solution raw material.

Preferably, the method of the present invention is characterized in that the crosslinking agent is PU and/or EVA.

Preferably, the method of the present invention is characterized in that the die is made of a material which tolerates 200° C. and above.

Preferably, the method of the present invention is characterized in that the surface of the die undergoes passivation so as to facilitate mold release.

Preferably, the method of the present invention is characterized in that the colloidal solution plastic material takes shape when heated.

Preferably, the method of the present invention is characterized in that step 3 further comprises heating up the colloidal solution plastic material to 80~120° C. to thereby allow the colloidal solution plastic material to take shape.

Preferably, the method of the present invention is characterized in that step 3 further comprises heating the colloidal solution plastic material for 2~4 hours to thereby allow the colloidal solution plastic material to take shape.

The method of the present invention features mixing silicon dioxide particles, polydimethylsiloxane (PDMS), and an additive to form a colloidal solution raw material by a compounding process and a ripening process. When a shear force, whose strength falls within a specific range of strength values, is exerted on the colloidal solution raw material, the silicon dioxide molecules in the colloidal solution raw material aggregate spontaneously to thereby increase the viscosity of the colloidal solution. Hence, the method of the present invention is characterized by shear thickening.

A colloidal solution plastic material for use in the method of the present invention is formed by mixing a crosslinking agent and a colloidal solution raw material to achieve the foaming thereof. The colloidal solution plastic material thus formed is thermosetting.

The present invention provides a method for making an impact-absorptive material by filling a die with a colloidal solution plastic material and heating the colloidal solution plastic material in the die such that it cures and takes shape.

Accordingly, the present invention provides a method for making an impact-absorptive material, quickly and at low costs, for use in physical education, medicine, transportation, and safety-enhancing equipment.

BRIEF DESCRIPTION

Objectives, features, and advantages of the present invention are hereunder illustrated with specific embodiments in conjunction with the accompanying drawings, in which:

FIG. 1 is a flow chart of a method for making an impact-absorptive material according to the present invention.

DETAILED DESCRIPTION

To enable persons skilled in the art to fully understand the objectives, features, and advantages of the present invention, the present invention is hereunder illustrated with specific embodiments.

Referring to FIG. 1, there is shown a method for making an impact-absorptive material according to the present invention. As shown in the diagram, the process flow of the method comprises the steps as follows:

Step 1: blending silicon dioxide particles of a diameter of 5,000 nm, polydimethylsiloxane (PDMS) of a molecular weight of 3,500, and an appropriate amount of isopropanol so as to form a liquid mixture essentially comprising silicon dioxide and PDMS, allowing the liquid mixture to settle until tiny bubbles in the liquid mixture are evenly distributed, thereby forming a colloidal solution raw material, wherein silicon dioxide particles account for 50% wt of the colloidal solution raw material.

Step 2: adding an appropriate amount of PU to the colloidal solution raw material formed in step 1, so as to form a crosslinking agent, and blending the mixture until a colloidal solution plastic material is formed.

Step 3: filling a die with the colloidal solution plastic material formed in step 2, and heating the colloidal solution plastic material in the die at 100° C. for 3 hours until the colloidal solution plastic material takes shape and forms an impact-absorptive material.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A method for making an impact-absorptive material, the method comprising the steps of:
    (step 1) mixing silicon dioxide particles, polydimethylsiloxane (PDMS), and an additive, performing a compounding process on the mixture to form a liquid mixture essentially comprising silicon dioxide and PDMS, settling the liquid mixture until tiny bubbles therein are evenly distributed, and performing a ripening process on the liquid mixture to form a colloidal solution raw material;
    (step 2) adding a crosslinking agent to the colloidal solution raw material, mixing the crosslinking agent and the colloidal solution raw material until foaming occurs, so as to form a colloidal solution plastic material; and
    (step 3) filling a die with the colloidal solution plastic material, and heating the colloidal solution plastic material in the die to 80~120° C. for 2~4 hours until the colloidal solution plastic material cures to thereby allow the colloidal solution plastic material to take shape and form the impact-absorptive material;
    wherein the PDMS is of a molecular weight of 200~5,000.

2. The method of claim 1, wherein the silicon dioxide particles are of a diameter of 50~500,000 nm.

3. The method of claim 1, wherein the additive is one of ethanol and isopropanol.

4. The method of claim 1, wherein silicon dioxide particles account for 30~60% wt of the colloidal solution raw material.

5. The method of claim 1, wherein the crosslinking agent is at least one of PU and EVA.

6. The method of claim 1, wherein the die is made of a material which tolerates 200 C.° and above.

7. The method of claim 1, wherein a surface of the die undergoes passivation so as to facilitate mold release.

8. The method of claim 1, wherein the colloidal solution plastic material takes shape when heated.

* * * * *